(12) United States Patent
Eriksson

(10) Patent No.: US 6,591,784 B1
(45) Date of Patent: Jul. 15, 2003

(54) METHOD AND A DEVICE FOR CLEANING TEATS OF AN ANIMAL

(75) Inventor: Jan Eriksson, Uttran (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 10/111,854

(22) PCT Filed: Sep. 7, 2000

(86) PCT No.: PCT/SE00/01731
§ 371 (c)(1),
(2), (4) Date: Apr. 30, 2002

(87) PCT Pub. No.: WO01/17337
PCT Pub. Date: Mar. 15, 2001

(51) Int. Cl.[7] .................................. A01J 7/04
(52) U.S. Cl. ............ 119/670; 119/14.18; 119/14.08
(58) Field of Search ............... 119/670, 14.18, 119/14.08, 14.1

(56) References Cited

U.S. PATENT DOCUMENTS

| | | | |
|---|---|---|---|
| 2,532,088 A | | 11/1950 | Cordis |
| 3,713,423 A | * | 1/1973 | Sparr, Sr. ............... 119/670 |
| 4,034,714 A | * | 7/1977 | Umbaugh et al. ....... 119/14.18 |
| 6,234,110 B1 | * | 5/2001 | Xavier ............... 119/14.47 |
| 6,321,682 B1 | * | 11/2001 | Eriksson et al. ......... 119/14.44 |

FOREIGN PATENT DOCUMENTS

| | | | |
|---|---|---|---|
| EP | 0527509 | 2/1993 | |
| EP | 0728412 | 8/1996 | |
| EP | 0801893 | 10/1997 | |
| GB | 2272626 | 5/1994 | |
| SU | 1676538 | 9/1991 | |
| WO | WO 9946978 A1 * | 9/1999 | ........ A01J/7/04 |
| WO | WO 0117338 A1 * | 3/2001 | ........ A01J/7/04 |

* cited by examiner

Primary Examiner—Charles T. Jordan
Assistant Examiner—John W. Zerr
(74) Attorney, Agent, or Firm—Timothy Platt

(57) ABSTRACT

The present invention relates to a device for injecting a cleaning liquid into a teat cleaning cup (3). Each nozzle means (55a–b) is connected to a corresponding and separate cleaning liquid supplying means (27, 29) for injecting said cleaning liquid alternately through said nozzle means (55a–b). The nozzle means (55a–b) are also so arranged in said teat cleaning cup (3) that when alternately injecting cleaning liquid trough each of said nozzle means the teat (9) is deflected away from the nozzle means (55a–b).

19 Claims, 4 Drawing Sheets

METHOD AND A DEVICE FOR CLEANING TEATS OF AN ANIMAL

TECHNICAL FIELD OF THE INVENTION

The present invention relates to an apparatus for cleaning a teat of an animal, comprising a substantially cylindrical teat cleaning cup intended to be attached to a teat to be cleaned, wherein the teat cleaning cup comprises nozzle means for injecting a cleaning liquid into the teat cleaning cup and drainage means for draining used cleaning liquid from the teat cleaning cup.

The invention also relates to a method for cleaning an animal teat, comprising the step of attaching a substantially cylindrical teat cleaning cup onto a teat to be cleaned during a cleaning session.

Finally, the invention relates to the use of the above mentioned method and apparatus for cleaning a teat in an automatic robot milking system.

BACKGROUND OF THE INVENTION

A problem when milking dairy animals, such as cows, is how to ensure that the teats of the animal are clean before milking commences. For this reason various machines have been proposed for cleaning the teats.

It is for instance known from EP 0 801 893 to use a device intended for cleaning and pre-milking teats, having teat cups comprising a plurality of nozzle holes for spraying a cleaning liquid onto teats inserted into said teat cups. When the teat cleaning is accomplished the teat can be pre-milked by means of a particular pre-milking cup portion which is moveable inside the teat cup. However, this device suffers from several disadvantages:

Firstly, it is not possible to increase the cleaning liquid flow through the nozzle holes without increasing the total fluid flow consumption through the cleaning device.

Secondly, the nozzle holes are arranged so as to spray the cleaning liquid almost directly against the teat. The animal may experience discomfort when they are exposed to a direct impact of the cleaning liquid.

Thirdly, spraying a cleaning liquid onto the teat in this way do not adequately clean the tip of the teat. This is very important since dirt and germs present in the opening of the milk canal may contaminate the collected milk.

Fourthly, while the skin of a teat usually is wrinkled dirt is easily stuck in the wrinkles. The dirt is difficult to remove even though spraying or flushing is performed through nozzle holes generously and uniformly distributed along the whole inside of the teat cup.

Fifthly, the teat cup includes moveable parts which involves an unnecessarily complicated design.

SUMMARY OF THE INVENTION

The object of the invention is to eliminate the above mentioned drawbacks so as to prepare an animal to a milking session that subsequent extraction of milk do not contain any contaminants.

An other object is to accomplish the above mentioned preparation in an animal friendly manner without causing any harm to the animal.

These objects are obtained by an apparatus as initially defined which is characterised in that:

said nozzle means comprises at least a first and a second group of nozzle members separated circumferentially in the teat cleaning cup;

a cleaning liquid supplying means is connected to each group of nozzle members; and means for alternating the supply of cleaning liquid to the groups of nozzle members through said liquid supplying means are provided so as to generate by said groups of nozzle members pulsating jets of cleaning liquid acting on the teat to be cleaned.

The object is also obtained by a method as initially defined which is characterised by:

alternating a step of injecting, into an inner space of the teat cleaning cup, a cleaning liquid through a first group of nozzle members with at least one other step of injecting, into said inner space of the teat cleaning cup, a cleaning liquid through at least a second group of nozzle members separated circumferentially from the first group of nozzle members so as to generate pulsating jets of cleaning liquid acting on the teat; and draining used cleaning liquid from said teat-cleaning cup.

By said apparatus and said method, respectively, is achieved a satisfactory cleaning result of the teat without subjecting the animal to discomfort. Consequently, less milk will be discarded due to presence of contaminants in the extracted milk.

According to a preferred embodiment of the invention vacuum supplying means is provided for applying an underpressure within said teat cleaning cup. Hereby is achieved that the drainage of the cleaning liquid as well as the injection of the cleaning liquid through said groups of nozzle members is improved.

Preferably, said cleaning liquid supplying means is comprised from cleaning liquid conduits, each connected to one of said groups of nozzle members, in fluid communication, via respective cleaning liquid valves, with a cleaning liquid supply and in fluid communication, via respective compressed-air valves, with a compressed-air supply. Hereby is achieved that the cleaning liquid may be injected into the teat cleaning cup in a controlled way.

Advantageously, said apparatus comprises a detergent agent supply connected to at least one of said cleaning liquid conduits downstream of said cleaning liquid valves via a detergent dispensing means for dispensing a predetermined amount of a detergent agent into the cleaning liquid conduit upon commencement of a cleaning session. Hereby is achieved an enhanced cleaning result of the teat of the animal when the detergent agent is used together with the cleaning liquid.

Preferably, said apparatus further comprises means for controlling and synchronising the opening and closing of said cleaning liquid valves and said compressed-air valves. Hereby is achieved that the cleaning of the animal is allowed to be performed automatically.

Advantageously, each group of nozzle members comprises at least two elongated nozzle elements provided with a plurality of orifices for injecting cleaning liquid into the teat cleaning cup. Hereby is achieved an enhanced injection distribution of the cleaning liquid into the teat cleaning cup.

Preferably, said elongated nozzle element is arranged substantially vertically in said teat cleaning cup extending from a lowermost part of said teat cleaning cup to an uppermost part of said teat cleaning cup and where said orifices are distributed along the elongated nozzle element. Hereby is achieved that the whole length of the teat is cleaned when injecting cleaning liquid through the orifices.

Preferably, said orifices are angled so as to inject the cleaning liquid tangentially onto an inserted teat. Hereby is avoided a direct impact of the cleaning liquid onto a teat and an enhanced whirling motion of the cleaning liquid inside the teat cleaning cup is achieved.

In case there are two groups of nozzle members separated circumferentially in the teat cleaning cup, one of said groups of nozzle members is advantageously arranged on a first semi-circumferential side of the teat cleaning cup while the other group of nozzle members is arranged on the opposite semi-circumferential side of the teat cleaning cup. Hereby is achieved that the teat is deflecting from side to side when alternating the injection between the first and the second groups of nozzle members. Consequently, hidden parts of the teat is exposed for the injected cleaning liquid.

Advantageously, said first and second groups of nozzle members are symmetrically arranged on said first and second semi-circumferential sides of the teat cleaning cup. Hereby is achieved an uniformly distributed cleaning intensity of the teat.

Preferably, said method comprises the step of applying an under-pressure within the teat cleaning cup. Hereby is achieved an enhanced drainage of the cleaning liquid.

Advantageously, said method further comprises the step of adding a detergent agent to the cleaning liquid upon commencement of either one of said alternating injecting steps. Hereby is achieved an enhanced cleaning action of the teat.

Preferably, said method further comprises the step of using compressed-air and/or vacuum for injecting said cleaning liquid into the teat cleaning cup. Hereby, the injection of the cleaning liquid is facilitated.

Advantageously, said method further comprises the step of opening and closing relevant valves for controlling and synchronising said alternating injecting steps. Hereby is achieved controlled ways of injecting the cleaning liquid.

Preferably, said method further comprises the step of drying the teat from cleaning liquid by venting ambient air into the teat cleaning cup. Hereby is achieved that remaining cleaning liquid is removed from the teat cleaning cup.

Preferably, said method further comprises the step of stimulating the teat by repeatedly supplying compressed-air into the teat cleaning cup. Hereby is achieved that milk letdown is easier induced since the pressure in the teat cleaning cup fluctuates.

Advantageously, said method further comprises the step of increasing applied under-pressure within the teat cleaning cup for extracting pre-milk, subsequent to said teat cleaning session. Hereby is achieved that cleaning and pre-milking can be performed using the same cleaning device.

Preferably, the method and the apparatus for cleaning a teat is used in an automatic robot milking system. Hereby is achieved an automatically performed treatment with little human intervention. The performance of the treatment may also be adapted to the demands of a specific animal since a robot milking system is controlled by pre-recorded algorithms interpreting information from various sensors and detectors.

DRAWING SUMMARY

For a better understanding of the invention, exemplifying embodiments will now be described with reference being made to the accompanying drawings, in which.

Figure 6A:
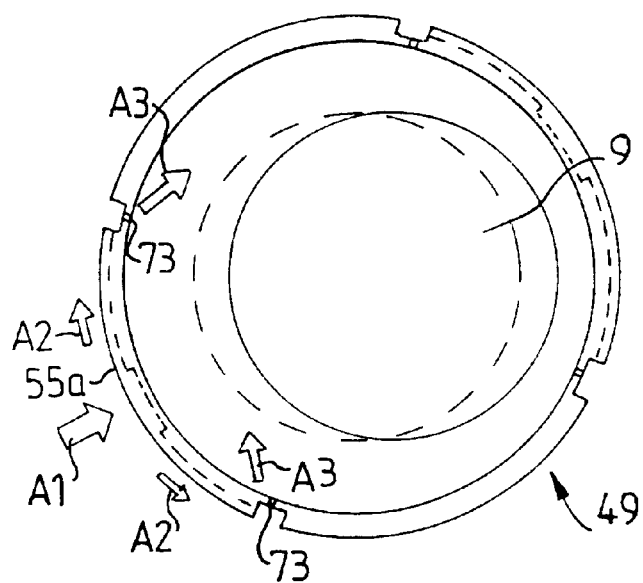
Figure 6B:
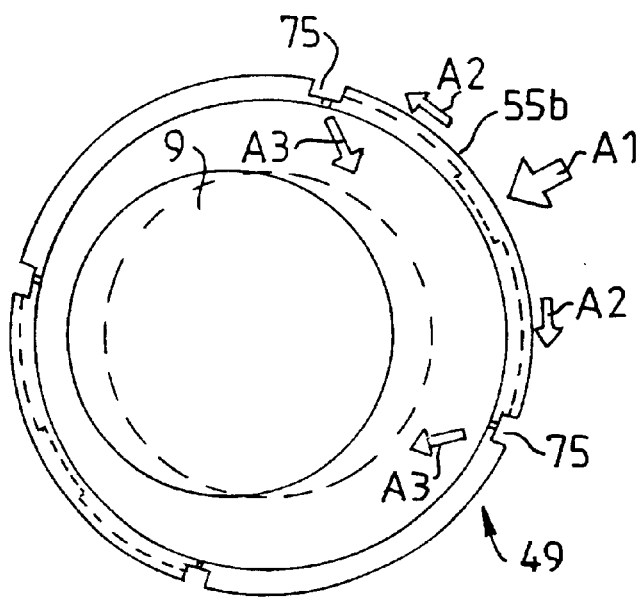

FIGS. 6a–b show cut out top views of the inner sleeve when the teat cleaning cup is attached to a teat and the pulsating jets of the cleaning liquid into the teat cleaning cup through a first and a second group of nozzle members.

DETAILED DESCRIPTION OF THE PREFERRED EMBODIMENT

Figure 1:
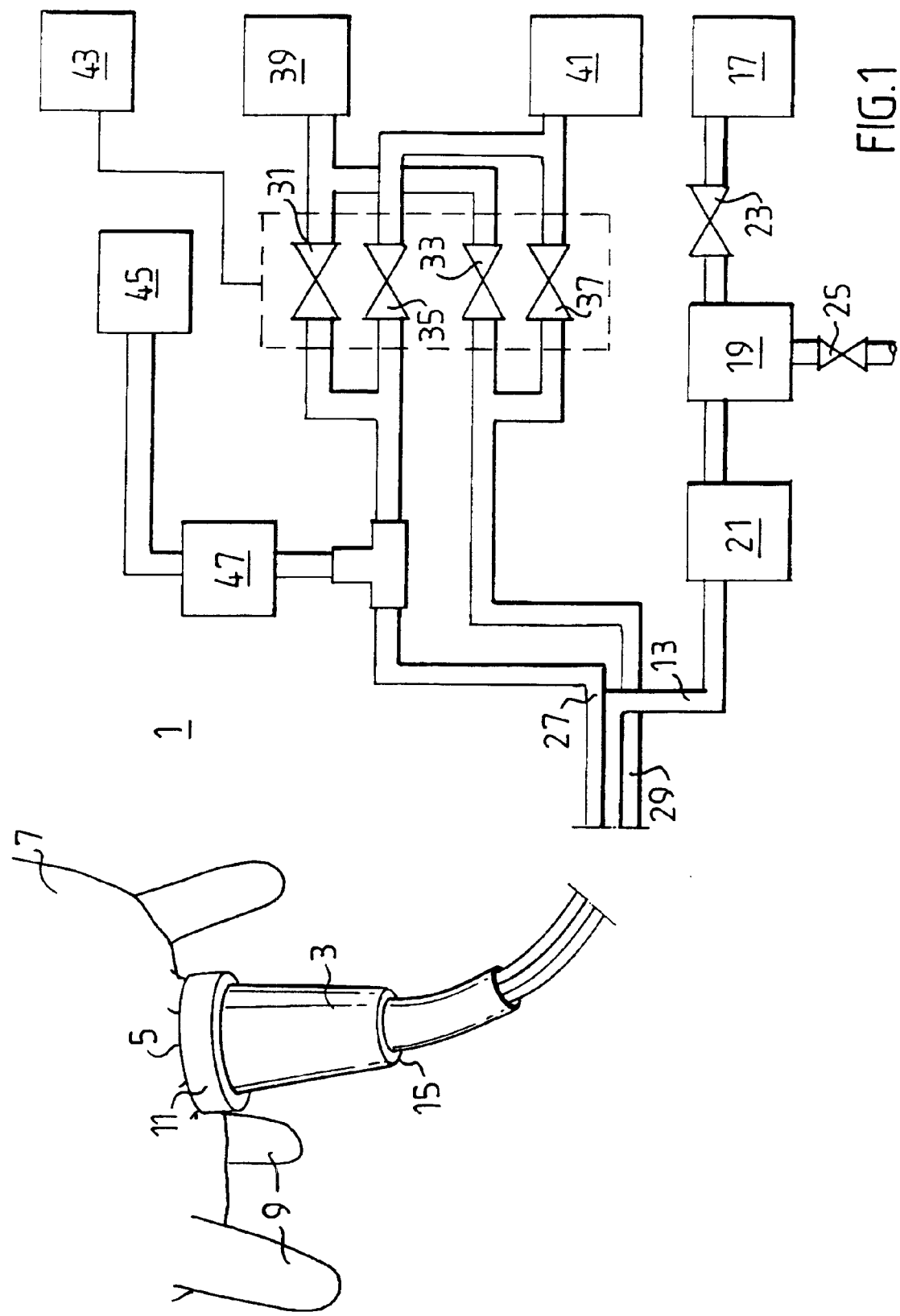
FIG. 1 shows a schematic view of an animal's udder connected to the inventive apparatus.

FIG. 1 shows schematically a preferred embodiment of an apparatus 1 for cleaning and pre-milking teats of an animal.

The apparatus 1 comprises a substantially cylindrical teat cleaning cup 3 with a teat receiving opening 5 in its upper surface. The teat cleaning cup 3 is intended to be placed under an udder 7 of an animal with the opening 5 below a teat 9 which is to be cleaned. The teat cleaning cup 3 is then raised so that the teat 9 enters the teat cleaning cup 3 through the opening 5. The opening 5 is provided with sealing means 11 in the shape of a flexible collar 11 which is in substantially air-tight contact with the udder 7 when the teat 9 is fully inserted into the teat cleaning cup 3. The teat cleaning cup 3 comprises nozzle means (not shown in this figure) intended to inject cleaning liquid into the teat cleaning cup 3 for cleaning the teat 9.

A vacuum supplying means 13 in the form of a non-collapsible pipe 13 is in one of its ends connected to an outlet opening 15 in the base of the teat cleaning cup 3 and with the other end to a vacuum supply 17 for supplying an under-pressure within the teat cleaning cup 3 so as to facilitate draining used cleaning liquid from the teat cleaning cup 3 but also to enable future pre-milking. To this end a collector waste tank 19 is arranged between the teat cleaning cup 3 and the vacuum supply 17 for collecting used cleaning liquid and extracted pre-milk. A milk detector 21 is arranged between the teat cleaning cup 3 and the collector waste tank 19 for detecting presence of milk in the cleaning liquid but also for possible examination of extracted pre-milk. A shut off valve 23 is arranged between the collector waste tank 19 and the vacuum supply 17, and a drain valve 25 is provided at the bottom of the collector waste tank 19.

The drain valve 25 serves to empty the contents of the collector waste tank 19 to a sewage system or for a suitable other application after every cleaning session, or when required. The shut off valve 23 serves to eliminate the supply of under-pressure within the teat cleaning cup 3 when desired, e.g. when the cleaning session is completed and the teat cleaning cup 3 is detached from the teat 9.

The apparatus comprises cleaning liquid supplying means in the form of first and second cleaning liquid conduits 27, 29 connected to the teat cleaning cup 3 and in fluid communication with said not shown nozzle means inside the teat cleaning cup 3 for supplying them with cleaning liquid. The first and second cleaning liquid conduits 27, 29 are, via cleaning liquid valve means 31, 33 and compressed-air valve means 35, 37, connected to a cleaning liquid supply 39 and to a compressed-air supply 41, respectively. The opening and closing of the cleaning liquid valve means 31, 33 and the compressed-air valve means 35, 37 are controlled by controlling means 43, such as a computer.

A detergent agent supply 45 can be selectively connected, via a detergent dispensing means 47, to either one of said first and second cleaning liquid conduits 27, 29. The detergent dispensing means 47 dispenses a pre-determined amount of the detergent agent upon commencement of the cleaning session or when required.

Figure 2:
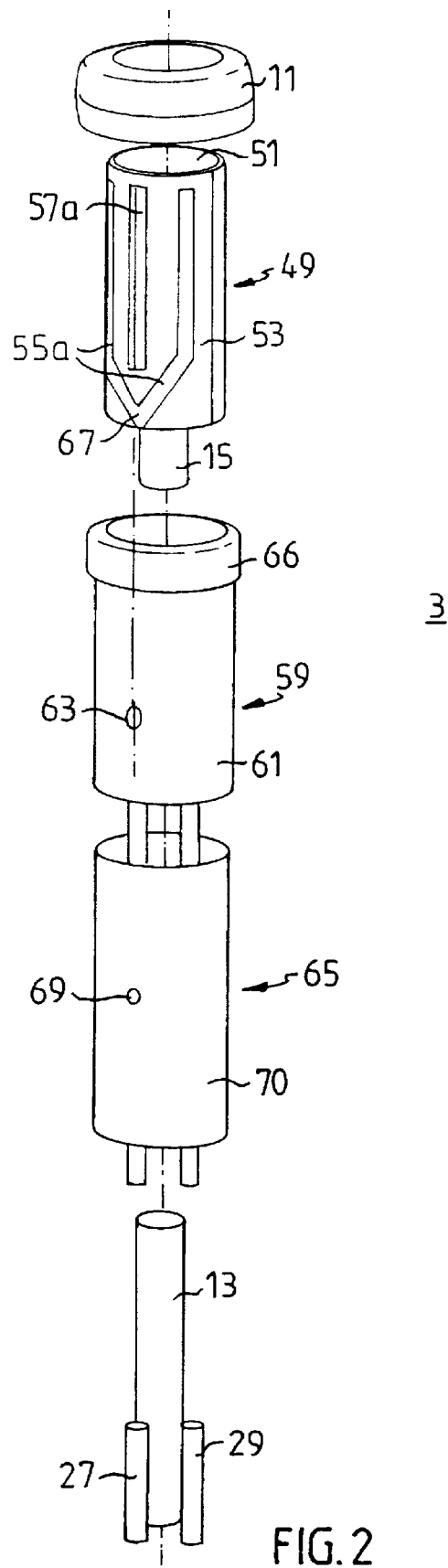
FIG. 2 shows an exploded view of a teat cleaning cup comprised in the apparatus.

FIG. 2 shows an exploded view of the teat cleaning cup 3 showed in FIG. 1. The teat cleaning cup 3 comprises an elongated tubular inner sleeve 49 encompassing an inner space 51 intended to receive a teat 9. A cylindrical wall 53 of the inner sleeve 49 is provided with slots 55, 57 circumferentially separated along said cylindrical wall 53. These slots 55, 57 are provided with a plurality of not shown orifices (shown in FIGS. 3–5) facing the inner space 51.

Only one group of each type of slots 55, 57 can be seen in this figure but in this preferred embodiment two groups of each type of slots are arranged symmetrically on opposite side of the cylindrical wall 53. This will be apparent in coming figures.

A tubular partition sleeve 59 is concentrically and tightly arranged about the inner sleeve 49. In this way the slots 55, 57 of the inner sleeve 49 and a cylindrical wall 61 of the partition sleeve 59 form circumferentially separated channels 55, 57 which are intended to transport fluids into the inner space of the teat cleaning cup 3 through said orifices. From now on the slots 55, 57 will be referred to as channels 55, 57 even though there is a distinction between the terms.

There are two types of channels. Substantially Y-shaped channels 55 intended for transportation of cleaning liquid and/or compressed air, and I-shaped channels 57 intended for transportation of ambient air. The fit-up between the inner- and the partition sleeves 49, 59 is thus important for eliminating leakage between the circumferentially separated channels 55, 57. The various types of channels 55, 57 are substantially longitudinal with the inner sleeve 49 and the partition sleeve 59 and accordingly also with the teat cleaning cup 3.

The partition sleeve 59 is provided with at least one opening 63 in its cylindrical wall 61 intended to work as an inlet for ambient air into the I-shaped channel(s) 57. Each opening 63 has to be lined up with a corresponding I-shaped channel 57 during assembling to achieve a working unit.

Concentric with the partition sleeve 59 and accordingly also with the inner sleeve 49 is a tubular outer sleeve 65 arranged, which together with a flexible collar 11 mounted at the top of the outer sleeve 65 complete the teat cleaning cup 3.

At least one opening 69 is also provided in a cylindrical wall 70 of the outer sleeve 65. Each opening 69 serves as inlets for ambient air to be distributed to each opening 63 in the partition sleeve. For this reason it is important that a gap space is arranged between the partition sleeve 59 and the outer sleeve 65. A circumferential flange 66 formed in an upper portion of the partition sleeve 59 ensures this gap space.

The outlet opening 15 of the teat cleaning cup communicates with the inner space 51 of the teat cleaning cup 3 and is connectable to the non-collapsible pipe 13, and lower portions 67 of the Y-shaped channels 55 are connectable to said first and second cleaning liquid conduits 27, 29, respectively. The latter may be done in many ways, e.g. intermediate pipes and connection pipes on the inside of the walls 53, 61 of the partition sleeve 59 and the outer sleeve 65, respectively so as to achieve a satisfactory connection. This is however of less importance to the invention and is thus not elucidated any further.

Obviously, the Y-shaped channels 55 can have other shapes. The main thing is that the channels 55 extend longitudinally with the teat cleaning cup 3 and that the orifices are generously distributed along the channels so as to cover the whole surface of an inserted teat when injecting cleaning liquid into the inner space of the teat cleaning cup.

It is also conceivable to exclude the opening(s) in the wall of the outer sleeve 65 and instead form ducts or pipes, in the gap space between the partition sleeve 59 and the outer sleeve 65, connected to the openings 63 in the wall 61 of the partition sleeve 65 and extending to a bottom portion of the outer sleeve 65.

It is not necessary with just two groups of each type of channels 55, 57, a plurality of groups of each type of channels 55, 57 separated circumferentially in the teat cleaning cup 3 are also conceivable.

The outer sleeve may also be provided with a hand-grip to facilitate manual handling of the teat cleaning cup by an operator.

Figure 3:
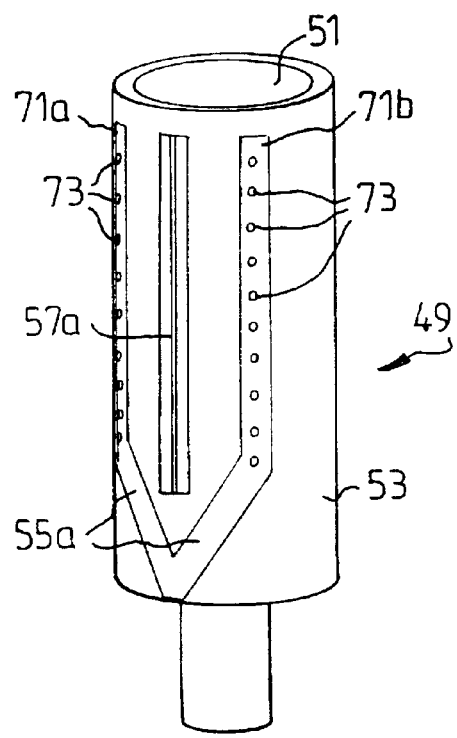
FIG. 3 shows a side view of an inner sleeve of the teat cleaning cup illustrating slots in a wall of the inner sleeve.

FIG. 3 shows the inner sleeve 49 of the teat cleaning cup 3 and serves to better illustrate the channels 55, 57 formed in the cylindrical wall 53. Below, the various Y-shaped channels 55 will exclusively be referred to as groups of nozzle members 55 since this is the main function of the channels 55 during use.

There are, as said before, two groups of nozzle members 55, a first 55a and a second 55b, arranged on opposite circumferential sides of the cylindrical wall 53 of the inner sleeve 49. Each group of nozzle members 55a–b comprises two nozzle elements 71a–b, 72a–b, respectively, each having a plurality of orifices 73, 75, respectively facing the inner space 51.

Between the nozzle elements 71a–b and 72a–b are formed the I-shaped channels 57, also provided with not shown orifices facing the inner space 51. The I-shaped channels 57 are elongated and longitudinal with the teat cleaning cup 3 and are intended to transport ambient air into the inner space 51 of the teat cleaning cup 3.

Figure 4:
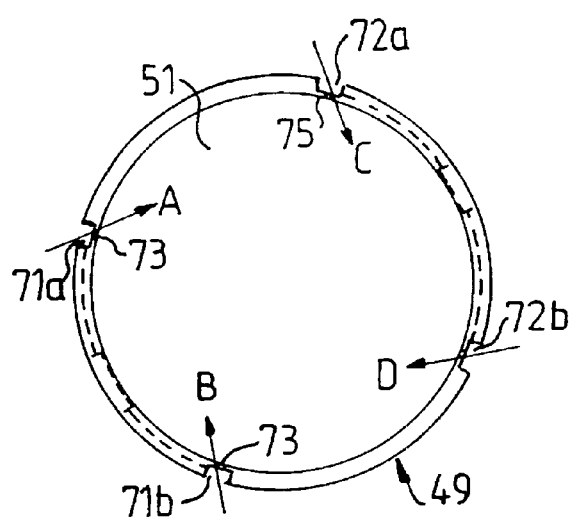
FIG. 4 shows a cross-sectional top view of the inner sleeve showed in FIG. 3.

In FIG. 4 is shown the first and the second groups of nozzle members 55a–b arranged on opposite semi-circumferential sides of the inner sleeve 49. The nozzle elements 71a–b, 72a–b of each group of nozzle members 55a–b are provided with said orifices 73, 75. These orifices 73, 75 are angled so as to inject the cleaning liquid tangentially onto an inserted teat 9. In this way a direct impact of the injected liquid onto the teat 9 is avoided. Instead these angled orifices 73, 75 enable a whirl of the injected liquid inside the teat cleaning cup 3, and it is the whirl itself that create the cleaning effect on the teat 9. The whirl will surround the teat 9 from the part closest to the udder 7 to the tip of the teat 9, thereby removing dirt from the teat 9.

Arrows A, B, C, D indicate the direction of the injected cleaning liquid due to the angled orifices 73, 75. It is easy to understand that the tangential injection will create a whirl inside the teat cleaning cup 3. The I-shaped channels 57 have in this figure been omitted for the sake of clarity.

It is of course conceivable to have more than two nozzle elements 71a–b and 72a–b forming the groups of nozzle members 55a–b.

Figure 5:
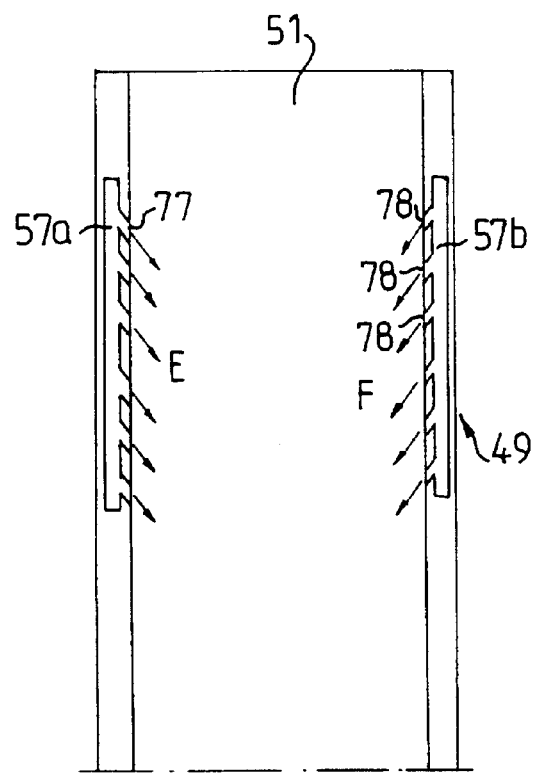
FIG. 5 shows a cross-sectional side view of the inner sleeve showed in FIG. 3.

In FIG. 5 is shown a first and a second I-shaped channel 57a–b arranged on opposite sides of the inner sleeve 49. In this preferred embodiment of the invention there are two I-shaped channels 57a–b, where each channel 57a and 57b is arranged between the nozzle elements 71a and 71b as well as between 72a and 72b, respectively. The nozzle elements 71a and 71b have in this figure been omitted for the sake of clarity. The arrows E, F in FIG. 5 indicate the direction of the ambient air vented into the inner space 51 of the teat cleaning cup 3 during a cleaning session.

The I-shaped channels 57a–b are provided with orifices 77, 78, and angled downwards. In this way the ambient- and venting air into the teat cleaning cup 3 enhances the drainage of the cleaning liquid from the teat cleaning cup 3 during the cleaning session. It also improves the cleaning action by increasing the turbulence of the cleaning liquid inside the inner space 51. Finally it dries the teat 9 when the teat cleaning is completed.

OPERATION

A cleaning session (cleaning phase+pre-milking phase) is performed in the following way: The teat cleaning cup 3 will be located beneath a teat 9 to be cleaned and the teat cleaning cup 3 is lifted upwards by a gripping unit belonging to a robot arm or simply by an operator's hand, and the teat 9 is sucked into the teat cleaning cup 3 by means of the vacuum occurring in the teat cleaning cup 9. The cleaning phase can now commence and the teat cleaning cup 3 will be supported by the gripping unit or the operator's hand during the whole cleaning session.

When the teat 9 is inside the teat cleaning cup 3 the applied vacuum will expand the teat 9 and the skin will be stretched. The expansion of the teat 9 cracks dirt present on the teat 9 and makes it easier to remove dried on matter. It also stretches out the wrinkles in the teat skin and expose a greater surface to be cleaned. The vacuum is applied through the non-collapsible pipe 13 at the bottom of the teat cleaning cup 3. Ambient air will now be sucked into the teat cleaning cup 3, due to the under pressure inside the teat cleaning cup 3, through the opening(s) 69 in the wall of the outer sleeve 65, via the gap space between the outer- and partition sleeves 65, 59, through the opening(s) 63 in the wall 61 of the partition sleeve 59, and further via the I-shaped channel(s) 57*a*–*b* formed by the partition- 59 and the inner sleeve 49 and finally through the several orifices 77, 78 in the wall 53 of the inner sleeve 49 into the inner space 51.

The cleaning liquid is now injected, with high speed, into the teat cleaning cup 3 through the first or the second cleaning liquid conduits 27, 29, via the first or the second group of nozzle members 55*a*–*b*, and through the orifices 73, 75 into the inner space 51 of the teat cleaning cup 3.

The cleaning liquid is alternated between the first- and second cleaning liquid supplying means 27, 29. This is accomplished by means of valve means 31, 33, 35, 37 controlled by controlling means 43. These valve means 31, 33, 35, 37 can have two positions: open and closed.

Referring now to FIG. 1 for explaining the valve means function. Before cleaning commences all valve means 31, 33, 35, 37 are usually closed. When the cleaning session commences the first cleaning liquid valve 31 is opened and cleaning liquid originating from the cleaning liquid supply 39 is entering the first cleaning liquid conduit 27. Simultaneously, the second compressed air valve 37 is opened. The other valve means 33, 35 remain closed. After a predetermined time interval the first cleaning liquid valve 31 as well as the second compressed air valve 37 is closed and the other valves 33, 35 are also switching to its open positions.

Now, no more cleaning liquid is entering the first cleaning liquid conduit 27, but since the first compressed air valve 35 now is open the compressed air, originating from the compressed air supply 41, is entering the first cleaning liquid conduit 27 forcing the cleaning liquid present in the first cleaning liquid conduit 27 further to the first group of the nozzle members 55*a* so as to inject jets of cleaning liquid through the orifices 73 into the inner space 51.

Furthermore, cleaning liquid originating from the cleaning liquid supply 39 is now entering the second cleaning liquid conduit 29, since the second cleaning liquid valve 33 is open and while the second compressed air valve 37 is closed. After a predetermined time interval the second cleaning liquid valve 33 is closed, as well as the other valves 31, 35, 37 are switching to its other positions.

Now, no more cleaning liquid is entering the second cleaning liquid conduit 29, but since the second compressed air valve 37 now is open the compressed air, originating from the compressed air supply 41, is entering the second cleaning liquid conduit 29 forcing the cleaning liquid present in the second cleaning liquid conduit 29 further to second group of the nozzle members 55*b* so as to inject jets of cleaning liquid through the orifices 75 into the inner space 51.

The opening and closing of the valves 31, 33, 35, 37 are controlled by the controlling means 43, such as a computer or any other suitable regulator. This may be performed by pre-recorded algorithms stored in the controlling means 43. By opening and closing the valves 31, 33, 35, 37, as described above, the cleaning liquid is alternated between the first and the second groups of nozzle members 55*a*–*b*, so as the injection of the cleaning liquid enters the inner space of the teat cleaning cup 3 from different sides from time to time. This procedure is repeated during the whole cleaning phase.

The presence of vacuum in the teat cleaning cup 3 also facilitates the injection of the cleaning liquid into the inner space 51. To further improve the cleaning results a detergent agent can be added upon commencement of the cleaning phase. The detergent agent originates from the detergent agent supply 45 and is dispensed into the first cleaning liquid conduit via the dispensing means 47. This dispensing means 47 is determining the amount of detergent agent that is required to achieve a suitable cleaning effect and when to dispense it.

The predetermined amount of the detergent agent is dispensed into the first cleaning liquid conduit when all the valves 31, 33, 35, 37 are closed, i.e. before the commencement of the cleaning phase. When the first cleaning liquid valve 31 is opened for the first time the cleaning liquid is mixed with the detergent agent present in the first cleaning liquid conduit 27. When the first compressed air valve 35 is opened the detergent agent is entering the teat cleaning cup 9 together with the cleaning liquid through the first group of the nozzle members 55*a*.

It is also conceivable to connect the dispensing means 47 and the detergent agent supply 45 to the second cleaning liquid conduit 29 instead of the first cleaning liquid conduit 27. The controlling means 43 may also control the dispensing means 47.

FIG. 6*a* shows the cleaning liquid jets injected through the first group of nozzle members 55*a* into the inner space 51 of the teat cleaning cup 3. The big arrow, designated A1, indicates the entrance of the cleaning liquid in the lower portion 67 of the first group of the nozzle members 55*a*, the arrows designated A2 indicate where the cleaning liquid is divided among the nozzle elements 71*a*–*b*, and finally the arrows designated A3 indicate the tangential injection into the inner space 51 through the angled orifices 73. In this way the impact of the cleaning liquid onto the teat 9 is tangential and therefor less harmful to the animal teat.

FIG. 6*b* shows the cleaning liquid jets injected through the second group of nozzle members 55*b* into the inner space 51 of the teat cleaning cup 3. The big arrow, designated A1, indicates the entrance of the cleaning liquid in the lower portion 67 of the second group of the nozzle members 55*b*, the arrows designated A2 indicate where the cleaning liquid is divided among the nozzle elements and finally the arrows designated A3 indicate the tangential injection into the inner space 51 through the angled orifices 75. In this way the impact of the cleaning liquid onto the teat 9 is tangential and therefor less harmful to the animal teat.

A whirl is created in the teat cleaning cup 3 due to the tangential injection, and due to this whirl the teat is cleaned. When alternating between these two groups of nozzle members 55a–b the teat 9 will deflect in lateral directions due to the pulsating impact on the teat 9. When the cleaning liquid is injected through the first group of nozzle members 55a the teat is deflected away from the first group of nozzle members 55a and when the cleaning liquid is injected through the second group of nozzle members 55b the teat is deflected away from the second group of nozzle members 55b. This has several advantages: Firstly it is possible to increase the cleaning liquid flow through the orifices 73, 75 without increasing the total fluid flow consumption in the system, since only one group of nozzle members 55a or 55b is used at a time. Secondly, the tip of the teat 9 is more adequately cleaned when the tip is deflecting away from the centre of the inner space 51, where the turbulent motion of the cleaning liquid whirl is lowest, to a location closer to the periphery of the inner space 51, where the turbulent motion of the cleaning liquid whirl is greater. Thirdly, there is a possibility to clean less exposed parts of the teat 9 more carefully, since the teat 9 is oscillating forward and backwards during the cleaning session.

The venting of free air into the teat cleaning cup is not shown in these figures. The dotted lines in FIG. 6a–b indicate a static location of the teat 9 when it is not deflected due to a pulsating injection.

When the cleaning phase is completed the pulsating air and cleaning liquid is shutoff and the vacuum level is increased so as to start the pre-milking phase which only last for a couple of seconds. The purpose with the pre-milking is only to extract the first drops of milk from the teat since the pre-milk usually contains germs. By increasing the vacuum level milk is extracted due to the pressure difference. In the meantime free air is vented into the teat cleaning cup 3, via the I-shaped channels 57a–b of the inner sleeve 49 and through the orifices 77, 78 into the inner space 51 of the teat cleaning cup 3, and the air stream blows away the small water drops so as to dry the teat 9 upon completition of the cleaning session.

It is also conceivable to inject compressed air in a pulsating manner into the teat cleaning cup while the vacuum level is increased. This is accomplished by means of opening and closing the compressed air valves 35, 37 while keeping the cleaning liquid valves 31, 33 closed and has a stimulating effect on the induction of pre-milk.

The "strangling" of the teat by means of the flexible collar 5 is also reduced when the vacuum level in the teat cleaning cup 3 is oscillating.

Both the cleaning liquid and the extracted pre-milk is collected in the collector waste tank during the cleaning session and the collector waste tank is emptied between different cleaning sessions, i.e. between cows. The pre-milking will be supervised by the milk detector 21 for assuring presence of pre-milk and certain quality control.

What is claimed is:

1. Method for cleaning an animal teat, comprising the steps of:
    attaching a substantially cylindrical teat cleaning cup onto a teat to be cleaned during a cleaning session,
    alternating a step of injecting, into an inner space of the teat cleaning cup, a cleaning liquid through a first group of nozzle members with at least one other step of injecting, into said inner space of the teat cleaning cup, a cleaning liquid through at least a second group of nozzle members separated circumferentially from the first group of nozzle members so as to generate pulsating jets of cleaning liquid acting on the teat; and
    draining used cleaning liquid from said teat cleaning cup.

2. Method according to claim 1, further comprising the step of:
    applying an under-pressure within the teat cleaning cup.

3. Method according to claim 1, further comprising the step of:
    adding a detergent agent to the cleaning liquid upon commencement of either one of said alternating injecting steps.

4. Method according to claim 1, further comprising the step of:
    using at least one of compressed-air or vacuum for injecting said cleaning liquid into the teat cleaning cup.

5. Method according to claim 1 further comprising the step of:
    opening and closing relevant valves for controlling and synchronising said alternating injecting steps.

6. Method according to claim 1 further comprising the step of:
    drying the teat from cleaning liquid by venting ambient air into the teat cleaning cup.

7. Method according to claim 1 further comprising the step of:
    stimulating the teat by repeatedly supplying compressed-air into the teat cleaning cup.

8. Method according to claim 2 further comprising the step of:
    increasing applied under-pressure within the teat cleaning cup for extracting pre-milk, subsequent to said teat cleaning session.

9. Apparatus for cleaning a teat of an animal, comprising a substantially cylindrical teat cleaning cup intended to be attached to a teat to be cleaned, wherein the teat cleaning cup comprises nozzle means for injecting a cleaning liquid into the teat cleaning cup and drainage means for draining used cleaning liquid from the teat cleaning cup,
    said nozzle means comprising at least a first and a second group of nozzle members separated circumferentially in the teat cleaning cup;
    a cleaning liquid supplying means is connected to each group of nozzle members;
    means for alternating the supply of cleaning liquid to the groups of nozzle members through said liquid supplying means being provided so as to generate by said groups of nozzle members pulsating jets of cleaning liquid acting on the teat to be cleaned.

10. Apparatus according to claim 9, further comprising vacuum supplying means for applying an under-pressure within said teat cleaning cup.

11. Apparatus according to claim 9 wherein said cleaning liquid supplying means comprising cleaning liquid conduits, each connected to one of said groups of nozzle members, in fluid communication, via respective cleaning liquid valves, with a cleaning liquid supply and in fluid communication, via respective compressed-air valves, with a compressed-air supply.

12. Apparatus according to claim 11, wherein a detergent agent supply is connected to at least one of said cleaning liquid conduits downstream of said cleaning liquid valves via a detergent dispensing means for dispensing a predetermined amount of a detergent agent into the cleaning liquid conduit upon commencement of a cleaning session.

13. Apparatus according to claim 11 further comprising means for controlling and synchronising the opening and closing of said cleaning liquid valves and said compressed-air valves.

14. Apparatus according to claim 9 each group of nozzle members comprising at least two elongated nozzle elements having a plurality of orifices for injecting cleaning liquid into the teat cleaning cup.

15. Apparatus according to claim 14, each of said elongated nozzle element being arranged substantially vertically in said teat cleaning cup and each of said nozzle element extending from a lowermost part of said teat cleaning cup to an uppermost part of said teat cleaning cup.

16. Apparatus according to claim 14 wherein said orifices are angled so as to inject the cleaning liquid tangentially onto an inserted teat.

17. Apparatus according to claims 9, wherein there are two groups of nozzle members separated circumferentially in the teat cleaning cup one group of nozzle members being arranged on a first semi-circumferential side of the teat cleaning cup and the other group of nozzle members is arranged on the opposite semi-circumferential side of the teat cleaning cup.

18. Apparatus according to claim 17, said first and second groups of nozzle members being symmetrically arranged on said first and second semi-circumferential sides of the teat cleaning cup.

19. The use of the method for cleaning a teat in accordance with claim 1 or the apparatus in accordance with claim 9 in an automatic robot milking system.

* * * * *